Patented Mar. 3, 1942

2,274,725

UNITED STATES PATENT OFFICE 2,274,725

FILTERING COMPOSITION

David Olan Meeker and Edward E. Henderson, New York, N. Y., assignors to Schering Corporation, Bloomfield, N. J., a corporation of New Jersey No Drawing. Application June 16, 1938, Serial No. 214,048

3 Claims. (Cl. 167—90)

This invention relates to compositions for filtering out the erythemic wave bands of ultraviolet rays and more particularly relates to sunburn-preventing lotions, creams or other cosmetics.

It has been recognized that certain wave bands of ultraviolet rays have highly beneficial effects upon the human skin and organism. It has likewise been recognized that other wave bands of ultraviolet rays are capable of causing burning and blistering and as a consequence are extremely harmful to individuals whose skins are sensitive to these rays. Although there is considerable controversy as to the wave bands causing sunburn or erythema, it appears that there are two bands of ultraviolet rays lying between 2400 and 2500 Angstrom units and 2900 to 3100 Angstrom units which cause burning of the skin.

Many different types of chemical compounds have been used for filtering out the various wave bands of ultraviolet rays, among which are resorcinol and hydroquinone. Hydroquinone has been found to be highly efficient in filtering out the undesirable wave lengths of ultraviolet rays. However, hydroquinone has never been satisfactory as a filtering medium in cosmetics for preventing sunburn for the reason that when dissolved it is readily oxidized by the air and changes to an unpleasant dark brown color, thereby discoloring the cosmetic.

Because of the ability of hydroquinone to filter out the undesirable wave lengths of ultraviolet rays, it would be highly desirable to use this material if it were possible to stabilize and prevent discoloration of hydroquinone.

An object of the present invention, therefore, is to provide light filtering compositions which contain hydroquinone and which are characterized by stability and resistance to oxidation and discoloration.

Another object of the invention is to provide light filtering compositions such as, for example, cosmetics, which contain hydroquinone and which are at the same time stable in color even when brought into contact with air or oxygen.

Other objects of the invention will become apparent from a description of typical forms of compositions embodying the present invention.

A typical form of the invention consists of a sunburn lotion or cream which contains a sufficient quantity of hydroquinone to filter out ultraviolet rays having wave lengths between 2000 and about 3150 Angstrom units and an agent which is capable of inhibiting discoloration of hydroquinone.

Many different types of anti-oxidants have been mixed with hydroquinone in order to prevent the undesirable oxidation and discoloration of this material when in solution, but only the metabisulfites of alkali and alkaline earth metals such as, for example, potassium and sodium metabisulfites, have been found capable of preventing such oxidation and discoloration. These substances, moreover, are found to be effective only when the composition has a hydrogen ion concentration of less than 7.0. For example, slightly acid cosmetics have been made containing hydroquinone and potassium metabisulfite which are entirely stable in the presence of air but which discolor rapidly when sufficient alkali is added to render the composition slightly alkaline.

From a study of the filtering capabilities of these compositions it has been determined that the hydroquinone may be used in a concentration up to about 10%, and that between 3 and 7% of hydroquinone in a suitable vehicle effectively filters out the ultraviolet rays having a wave length between 2000 and about 3150 Angstrom units. The amount of sodium or potassium metabisulfite required to stabilize hydroquinone in solution has been found to be on the order of 1% or less. More than 1% can be used, however, without adversely affecting the filtering action of hydroquinone. In addition to the stabilizing effect of these metabisulfites, they are slightly acid and as a consequence, upon addition to slightly alkaline or neutral vehicles, render the vehicle sufficiently acidic to stabilize the hydroquinone. However, the stability of hydroquinone is not determined entirely by the hydrogen ion concentration of the composition. This has been determined by acidifying solutions of hydroquinone in the absence of potassium or sodium metabisulfite with such acids as citric acid, hydrochloric acid and nitric acid. Such solutions are found to turn brown very quickly.

Hydroquinone with potassium or sodium metabisulfite is particularly adapted to be used with cosmetics to prevent sunbrun. A typical lotion to which hydroquinone is added for preventing sunburn may consist of:

| | Parts |
|---|---|
| An emulsifying agent | 3 |
| Glycerine | 5 |
| Mineral oil | 2 |
| Distilled water | 90 |

This composition has a hydrogen ion concentration of about 6.5. To the lotion is first added about ¾ of a percent of potassium metabisulfite and then about 5% hydroquinone. The hydrogen ion concentration of the lotion is reduced to about 6.2 upon addition of potassium metabisulfite. This lotion is highly efficient in filtering out the ultraviolet rays having wave lengths between 2000 and about 3150 Angstrom units and therefore is effective in preventing sunburn.

Sunburn preventing properties may also be imparted to other cosmetics such as, for example, vanishing or cold creams. A typical vanishing cream consists of:

| | Parts |
|---|---|
| Stearic acid | 10.8 |
| Mineral oil | 5.4 |
| Sodium borate | .6 |
| Potassium hydroxide | .4 |
| Glycerine | .6 |
| Water | 82.2 |

This cream has a hydrogen ion concentration of about 7.5. It therefore is necessary to add a slightly greater percentage of sodium or potassium metabisulfite in order to reduce the hydrogen iron concentration below 7. To this basic cream, 5% hydroquinone and 1% potassium metabisulfite are added. The hydrogen ion concentration of the cream is reduced to about 6.2 by the potassium metabisulfite. This cream is stable, will not change color, and effectively filters out the ultraviolet rays having wave lengths between 2000 and about 3150 Angstrom units.

From the foregoing, it will thus be seen that we have provided a light filtering composition which is extremely stable and is highly effective in filtering out the ultraviolet rays that burn the skin. It will be understood, of course, that the stable hydroquinone and metabisulfite composition may be used with various types of cosmetics and that it has other uses than a sunburn preventative. Likewise, the proportions of hydroquinone and sodium or potassium metabisulfite may be varied considerably and a greater quantity of the metabisulfite added, if necessary, in order to reduce the particular composition with which it is used to a hydrogen ion concentration of less than 7.0. Therefore, the examples given above should be considered as illustrative only and not as limiting the scope of the following claims.

We claim:

1. A product for use in preventing sunburn of the human skin when exposed to sun rays, but permitting the passage of wave bands having a beneficial effect upon human skin, comprising a creamy preparation adapted to be spread upon the skin and containing a substantial amount of a creamy, non-irritating vehicle carrying hydroquinone distributed therethrough and an anti-oxidant of the group consisting of metabisulfites of alkali metals and alkaline earth metals, said creamy preparation being non-irritating to the skin, the anti-oxidant being present in an amount sufficient to give the preparation a pH value under 7, said preparation being stable and retaining substantially its normal color over long periods of time.

2. A product for use in preventing sunburn of the human skin when exposed to sun rays, but permitting the passage of wave bands having a beneficial effect upon human skin, comprising a preparation containing a substantial amount of a non-irritating vehicle carrying hydroquinone and a minor portion of an anti-oxidant of the group consisting of metabisulfites of alkali metals and alkaline earth metals, said preparation being adapted to be spread upon the human skin and being non-irritating to the skin, the anti-oxidant being present in an amount sufficient to give the preparation a pH value under 7, said preparation being stable and retaining substantially its normal color over long periods of time.

3. A product for use in preventing sunburn of the human skin when exposed to sun rays, but permitting the passage of wave bands having a beneficial effect upon human skin, comprising a creamy preparation adapted to be spread upon the skin and containing a substantial amount of a creamy, non-irritating vehicle carrying hydroquinone distributed therethrough and an anti-oxidant of the group consisting of metabisulfites of alkali metals and alkaline earth metals, said creamy preparation being non-irritating to the skin, hydroquinone being present in a concentration up to about 10% and the anti-oxidant present being of the order of 1%, to give the preparation a pH value under 7, said preparation being stable and retaining substantially its normal color over long periods of time.

DAVID OLAN MEEKER.
EDWARD E. HENDERSON.